G. Ulmann
Seal Lock.
No. 100,568.   Patented Mar. 8, 1870.
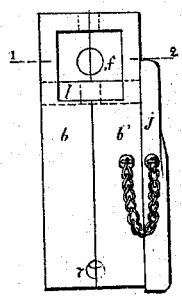 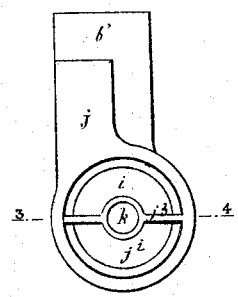 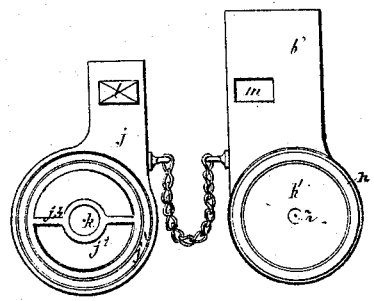
FIG. 2   FIG. 1   FIG. 3
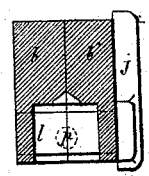 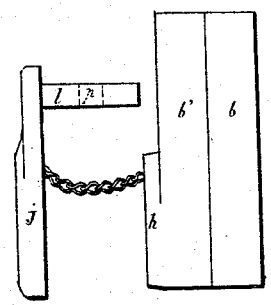 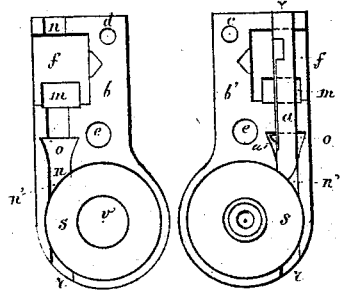
FIG. 4   FIG. 5   FIG. 6
FIG. 7
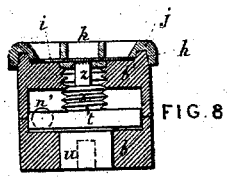 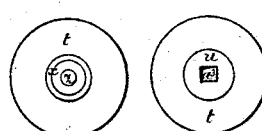
FIG. 8   FIG. 10   FIG. 11
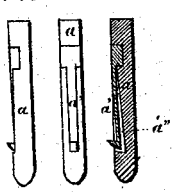 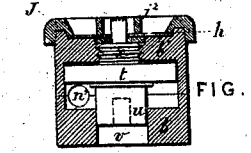 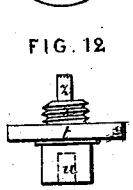
F. 13  F. 14  F. 15   FIG. 9   FIG. 12
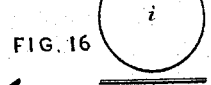
FIG. 16
Witnesses:
1. H. Hertz
2. C. F. Thirion
Inventor
G. Ulmann

United States Patent Office.

GUSTAVE ULMANN, OF IVRY-SUR-SEINE, NEAR PARIS, FRANCE, ASSIGNOR TO CHARLES RHODES GOODWIN, OF SAME PLACE.

Letters Patent No. 100,568, dated March 8, 1870.

---

IMPROVEMENT IN SEAL-LOCKS.

---

The Schedule referred to in these Letters Patent and making part of the same.

---

*To all whom it may concern:*

Be it known that I, GUSTAVE ULMANN, of Ivry-sur-Seine, in the Empire of France, have invented a new and useful Improvement in Seal-Locks; and I do hereby declare that the follwing is a full, clear, and exact description thereof, which will enable others skilled in the art to make and use the same, reference being had to the accompanying drawings forming part of this specification.

My invention relates to seal-locks, and consists in the combination of parts as hereinafter described.

Figure 1 is a side elevation of my improved lock, showing the seal-holding plate;

Figure 2 is an elevation of the same on the left face;

Figure 3 is an elevation with the seal-holding plate removed, and also shown in elevation;

Figure 4 is a transverse section taken on the line 1 2, fig. 2;

Figure 5 is a side elevation with the seal-holding plate detached;

Figure 6 is a sectional elevation showing the two parts as divided on the central line of fig. 2;

Figure 7 represents the perforated bolt or hasp of the mail-bag or other thing to be locked;

Figures 8 and 9 are sections on the line 3 4, fig. 1, with the seal in position;

Figure 10 is a face view of the disk for preventing the escape of the locking-pin;

Figure 11 is a face view of the side opposite that shown on fig. 10;

Figure 12 is an elevation of the same;

Figures 13, 14, and 15 are views of the locking-pin; and

Figure 16 is a plan and edge view of the seal.

$a$ is the locking-bolt, having an oval end and a recess in the side, wherein a spring-latch, $a'$, is secured, with a head projecting laterally from the slot near the rounded end of the pin, and shaped so that when this end is forced into a hole the catch will spring back into the recess.

$b\ b'$ represent the lock-case, consisting of a hollow block of metal of the form shown, or any other preferred form, and preferably made of two parts, for convenience of making the hollow spaces $f$ and S. They may be secured together as shown in the figs. 2 and 5, by a screw or rivet, $e$, and a dowel-pin, $d$, or by other suitable means.

The recess $f$ opens out at one side, as shown in fig. 2, and is for the reception of the bolt or hasp (fig. 7) of the mail-bag or other thing to be locked, the said bolt having a hole, $g$, through the end for the passage of the bolt $a$.

$n$ represents a hole passing through the case from end to end, and having an annular enlargement, $o$, forming a shoulder for the engagement of the spring-catch $a'$.

J' is the seal-holding plate, having a perforated projecting stud, $l$, and arranged with an annular groove, $j$, in the face, which fits against the side $b'$ of the case, for the reception of the annular projection $h$ thereon. It has a large circular opening, $j^2$, within this groove, traversed by a bar, $j^3$, having a central perforation, $k$.

$m$ is a mortise in the case for the reception of the stud $l$ when the plate J is placed in position, the hole $p$ therein coinciding with the hole $n$ of the case.

S is a circular recess in the enlarged end of the case, the axis of which coincides with the axis of the annular ring or projection $h$. This recess intersects the hole $n$, and has a circular opening, $v$, through the part $b$ of the case leading to it, and coinciding with its axis. There is also a small axial hole through the part $b'$ of the case leading to this recess.

$t$ is a thin disk of metal fitted to work in this recess, and has a smooth circular stud, $u$, fitted to the hole $v$, also a screw-threaded stud, $x$, on the opposite side, fitted to a screw-threaded hole in the part $b'$ of the case.

$z$ is a small perforating stud projecting from the end of stud $x$.

The stud $u$ has a square or other angular socket, $a^3$, in the end.

$i$ represents the soft metal, paper, or other seals, made in the form of thin disks.

When the disk $t$ rests on the bottom of the recess S, as shown in fig. 8, the stud $z$ will not project from the face of the cup or recess $h'$ of the part $b'$ of the case, and the said disk will stand in the intersection of the hole $n'$. It is adjusted to this position when the lock is to be locked, which is done by inserting the bolt, fig. 7, in the recess $f$, placing a seal, $i$, in the recess $h'$, placing the plate J over the same, and inserting the bolt $a$, as indicated by the arrow in fig. 6, when the spring-catch $a'$ will prevent its withdrawal, and the disk $t$ will prevent its advance.

To unlock it, a key is placed in the socket $a^3$, and the disk is turned to screw it away from before the hole $n$, to admit the escape of the bolt $a$, which may then be pushed forward and drawn out at $r$.

This movement of the disk $t$ forces the stud $z$ through the seal, punching and disfiguring it so that it will show that the lock has been opened.

The seals being in the possession of those only who have authority to open the locks, they cannot be again locked so as to deceive the authorized persons.

Having thus described my invention,

I claim as new, and desire to secure by Letters Patent—

The combination with the case $b\ b'$, arranged substantially as described, of the spring-bolt $a$, seal-holding plate J, disk $t$, and perforating stud $z$, all substantially as specified.

G. ULMANN.

Witnesses:
F. OLCOTT,
C. ANOS.